(12) United States Patent
Sun et al.

(10) Patent No.: US 9,272,926 B2
(45) Date of Patent: Mar. 1, 2016

(54) MEMBRANE ENHANCED DEIONIZATION CAPACITOR DEVICE

(76) Inventors: Zhuo Sun, Shanghai (CN); Likun Pan, Shanghai (CN); Haibo Li, Shanghai (CN); Yi Sun, Wellesley, MA (US)

(*) Notice: Subject to any disclaimer, the term of this patent is extended or adjusted under 35 U.S.C. 154(b) by 1108 days.

(21) Appl. No.: 13/329,319

(22) Filed: Dec. 18, 2011

(65) Prior Publication Data

US 2013/0153426 A1  Jun. 20, 2013

(51) Int. Cl.
*C02F 1/461* (2006.01)
*C02F 1/469* (2006.01)
*B82Y 30/00* (2011.01)
*B82Y 40/00* (2011.01)

(52) U.S. Cl.
CPC ............... *C02F 1/4691* (2013.01); *B82Y 30/00* (2013.01); *B82Y 40/00* (2013.01); *C02F 2001/46138* (2013.01); *Y10T 156/10* (2015.01)

(58) Field of Classification Search
CPC ............... C02F 1/4691; C02F 2001/46138; B82Y 40/00; B82Y 30/00; Y10T 156/10
See application file for complete search history.

(56) References Cited

U.S. PATENT DOCUMENTS

| 6,309,532 | B1 * | 10/2001 | Tran et al. | |
|---|---|---|---|---|
| 7,206,189 | B2 * | 4/2007 | Reynolds, III | B82Y 10/00 29/25.01 |
| 7,813,106 | B2 * | 10/2010 | Cai | C02F 1/4691 361/502 |

* cited by examiner

*Primary Examiner* — Arun S Phasge
(74) *Attorney, Agent, or Firm* — Jie Tan; JT Law Services, PC

(57) ABSTRACT

A membrane enhanced deionized capacitor (MEDC) device, consisting of insulating plates (6,7) and a series of MEDC unit cells, is provided. The MEDC unit cell includes a cation and anion ion-exchange membranes (2,4), one pair of carbon electrodes (1-1,1-2), a spacer (3) and an insulating holder (5) and is assembled in the order of [(1-1)/(2)/(3)/(5)/(4)/(1-2)]. The cation-exchange membrane combined with one electrode is used as negative electrosorptive electrode while the anion-exchange membrane combined with another electrode is used as positive electrode. Unit cells can be connected with each other in series, or in parallel. The devices can be made as either stack type or roll type.

15 Claims, 15 Drawing Sheets

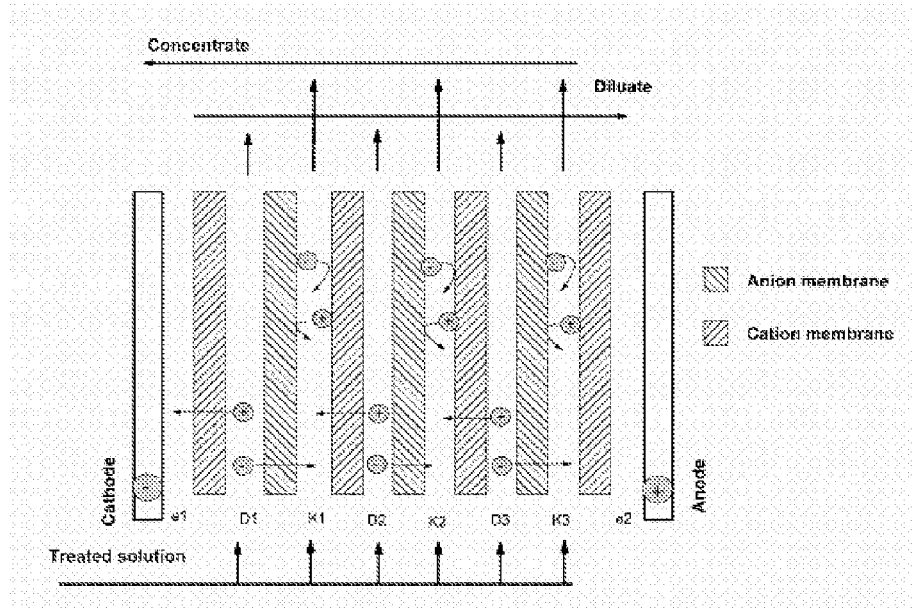
FIG. 1A (Prior art)      electrodialysis
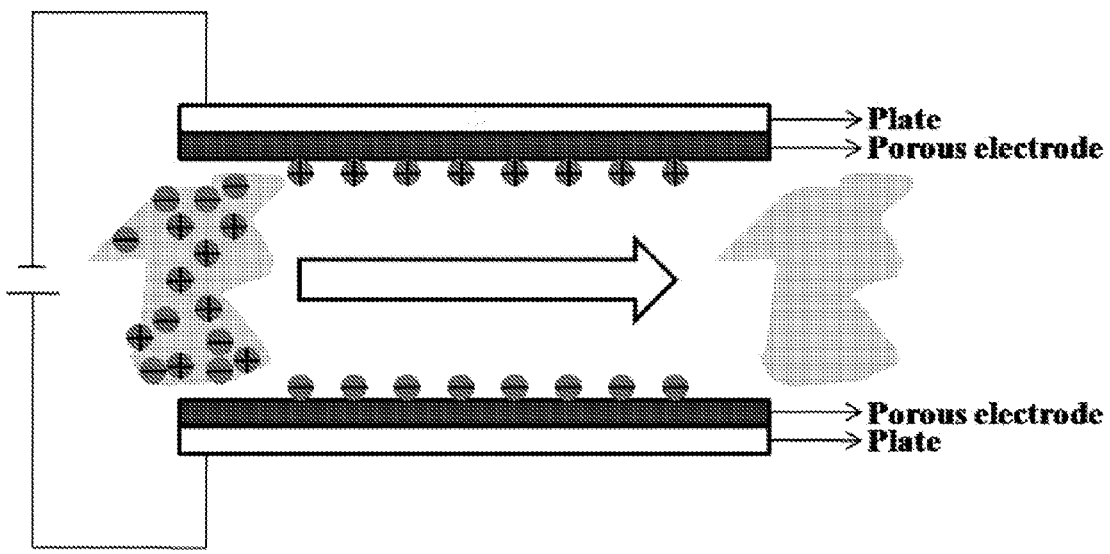
FIG. 1B (Prior Art)      CDI

MEMBRANE ENHANCED DEIONIZATION CAPACITOR DEVICE

DESCRIPTION OF RELATED ART

The present application relates to a capacitive deionization (CDI) water purifying device, and more particularly to a membrane enhanced deionization capacitor (MEDC) water purifying device.

Note that the points discussed below may reflect the hindsight gained from the disclosed inventions, and are not necessarily admitted to be prior art.

Most water is purified for human consumption, but highly purified water is desired in scientific research and medical, pharmacology, chemical and industrial applications. The most common used water purification methods are filtration for removing dissolvent particles and ion-exchange for removing unwanted ions. Electrodeionization has been developed to improve the ion-exchange efficiency where water is passed between a positive electrode and a negative electrode with ion exchange membranes in between the electrodes (FIG. 1A). Ion exchange membranes allow only positive ions to migrate from the treated water toward the negative electrode and only negative ions toward the positive electrode. Repeated treatment (electrodialysis) can lead to complete removal of ions from water. However, the ion-exchange water purification system is difficult to regenerate and the regeneration process causes secondary pollution. The maintenance cost for these types of systems is thus very high.

Various patent application publications describe various combinations of water purification designs are based on these ideas. For example, US 2005/0103723 A1 describes a device that conducts a continuous electrodeionization process using series of compartmented conventional eletrodeionization process with alternating semi-permeable ion exchange membranes and conventional electrodes. US 2008/0067125 A1 describes another device which basically adds a step of filtration to a conventional eletrodeionization process. These devices suffer the conventional shortcoming of inefficiency.

By making chemically modified electrodes capable of adsorbing ions onto their surfaces, capacitive deionization (CDI) method can remove ions from water without high electrical power consumption and secondary pollution (FIG. 1B). Later, a CDI device comprises porous high conductive, high specific surface area materials to increase the adsorptive capacity, as electrosorptive electrodes. Upon imposition of the electric field, ions in the liquid are attracted to their respective counter-electrode which can be easily regenerated by shorting circuit or even reversing voltage.

At first, the porous electrodes are made of activated carbon powder in a flow-through mode. Then carbon aerogel is configured as electrodes for a CDI stack device. See J. C. Farmer, D. Fix, G. Mack, R. Pekala, J. Poco, J. *Appl. Electrochem.* 26 (1996) 1007; J. C. Farmer, D. Fix, G. Mack, R. Pekala, J. Poco, *J. Electrochem. Soc.* 143 (1996) 159. Further, a one-step approach to fabricate carbon nanotube and carbon nanofiber (CNTs-CNFs) composite films via chemical vapour deposition as electrodes for CDI devices has been developed. See X. Z. Wang, M. G. Li, Y. W. Chen, R. M. Cheng, S. M. Huang, L. K. Pan, Z. Sun, *Appl. Phys. Lett.* 89, 053127 (2006).

However, for a conventional CDI device, due to the attraction from ions with opposite charges near the electrode, ions that have been adsorbed on the electrode may move back to the aqueous solution again. This undesirable migration of ions affects the efficiency of water purification process. US 2008/0144256 A1 tries to address this problem by developing a novel electrode where the porous electron conductive material of the electrode is coated with a layer of ion-exchange material on the surface. But the generated porous electrode by this directly coating of ion-exchange polymeric material may cause the porous surface of the electrode be blocked, thus reducing its adsorption capacity. Also there is still a distance from a design of an electrode assembly to a workable water purification device.

SUMMARY

The present application discloses new approaches to improve the efficiency of a CDI water purification device, and discloses a workable device for large scale water purification.

In one embodiment, a membrane enhanced capacitive deionization water purifying device comprises a plurality of membrane enhanced capacitive deionization unit cells connected either in series or in parallel, and each unit cell comprises a cathode sheet and an anode sheet, and in between the electrode sheets is a layer of spacer membrane and an insulating holder configured with a fluid entry and an exit holes for connecting water flow from one unit cell to another. Between the insulating holder and the electrode is either a layer of cation-exchange membrane if the attaching electrode is a cathode or a layer of anion-exchange membrane if the attaching electrode is an anode. The ion-exchange membranes are commercially available ion-exchange membranes.

In one aspect of an embodiment, a membrane electrode is made of electron conductive material sheet coated with a layer of porous carbon nanotube and nanofiber composite (CNTs-CNFs) or CNTs (CNFs) with graphene composite on the surface of either side, and a sheet of a spacer interspaced with a layer of ion-exchange membrane on each side wherein on the cathode side is a layer of cation-exchange membrane and on the anode side is a layer of anion-exchange membrane.

In one aspect of an embodiment, the sheets of electrodes, ion-exchange membranes and insulating holder and spacer sheet are rolled together forming an elongated cylinder as one packed unit for a cylinder shaped water purifier for cost effective mass production and manufacturing.

The cation-exchange and anion-exchange membranes are selectively permeable to cations and anions, respectively. When they are coupled with the porous electrodes, the ions with opposite charge will be prevented from moving towards the electrode. The ion desorption caused by the attraction from ions with opposite charge in the solutions will be minimized. The pore space near the electrode previously occupied by the ions with opposite charge can be freed to facilitate the ions to move towards electrode surface. Thus the salt removal capability can be enhanced. Further, the electrodes can be easily regenerated by shorting circuit or by reversing the voltage charge, thus the device needs not be chemically treated for regeneration and would be contamination-free. A further advantage for incorporating ion-exchange membrane into a CDI device is that the removal efficiency of weak ion species is greatly enhanced due to the selectivity of an ion-exchange membrane.

The disclosed innovations, in various embodiments, provide one or more of at least the following advantages. However, not all of these advantages result from every one of the innovations disclosed, and this list of advantages does not limit the various claimed inventions.

Highly cost effective for assembling and manufacturing large scale water purification devices;

High efficiency for water purification and regeneration of the system;

Highly energy efficient;
Long life time and environment safe.

BRIEF DESCRIPTION OF THE DRAWINGS

The disclosed application will be described with reference to the accompanying drawings, which show sample embodiments and which are incorporated in the specification hereof by reference, wherein:

FIGS. 1A and 1B schematically show prior art working process in water purification.

DETAILED DESCRIPTION OF SAMPLE EMBODIMENTS

Figure 2A:
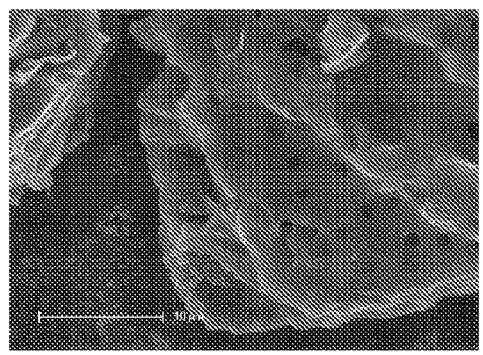
FIG. 2A is an electron microscopic photo of the typical structure of an activated carbon film.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the principle descriptions of the electrodes and unit cell assembly apply to all variations device assemblies, for example the in series and the in parallel connections, and the stack assemblies and the rolling assemblies. For clarity reason, the examples may be given based only on stack assembly and in series connections.

Figure 2B:
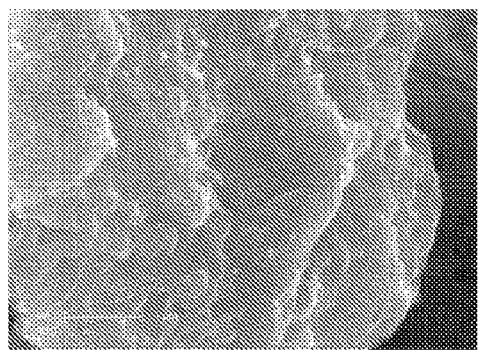
FIG. 2B is an electron microscopic photo of the typical structure of a carbon nanotube film.
Figure 2C:
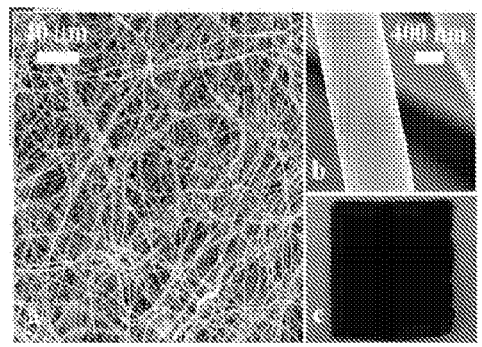
FIG. 2C is an electron microscopic photo of the typical structure of a carbon fiber film.
Figure 2D:
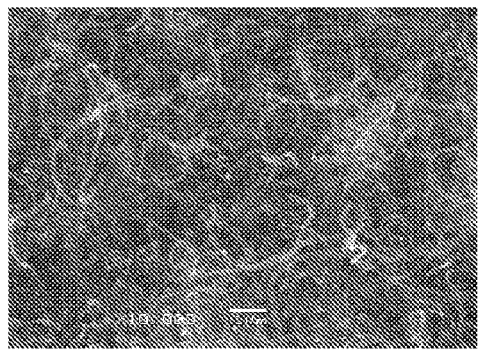
FIG. 2D is an electron microscopic photo of the structure of a carbon nanotubes and carbon nanofibers (CNTs-CNFs) composite film grown in accordance with this application.

"Electrosorptive electrodes" are electrodes that are conductive to electrons and also has an electronically chargeable surface upon application of voltage which can adsorb and hold oppositely charged ions on the surface. A cathode is capable of being negatively charged so that a cation moves towards it; an anode is capable of being positively charged so that an anion moves towards it. A carbon nanotube and carbon nanofiber (CNTs-CNFs) composite electrode is an electrode made of electron conductive material (current collector) that is coated with at least a layer of structured carbon nanotubes and nanofibers (FIG. 2D). The composite electrode can be made using CNTs with graphene or CNFs with graphene film on graphite substrate. Compared to an activated carbon powder porous film (FIG. 2A), carbon nanotube films (FIG. 2B) and carbon nanofibers (FIG. 2C), and carbon nanotube and carbon nanofiber, or CNTs with graphene or CNFs with graphene composite films show distinct different structure, and better electron conductiveness. For CNTs-CNFs, or CNTs with graphene or CNFs with graphene electrodes, the current collector may comprise graphite paper or sheet, carbon fiber cloth, stainless steels, platinum, titanium foil or sheet, and combinations thereof. Both sides of current collector are generally covered by porous carbon material.

An ion-exchange membrane is any or specific commercially available membrane or other specifically made ion-exchange membrane, independently made from any electrode, preferably made of durable fabric material, such as nylon. The ion-exchange membrane can be homogeneous membrane or heterogeneous membrane which contains a couple of activated ionic functional group and is selectively permeable to cations or anions. Cation-exchange membranes are generally permeable to cations and anion-exchange membranes are selectively permeable to anions. Taking the homogeneous membrane for example, it is often obtained by introducing the chemical reactive groups inside the advanced macromocular film, such as emulsion-polymerized styrene butadiene rubber, cellulose derivatives, polytetrafluoroethene, polychlorotrifluoroethene and polycyanoethylene, together with the monomer polymer, such as styrene and methyl methacrylate.

Figure 2E:
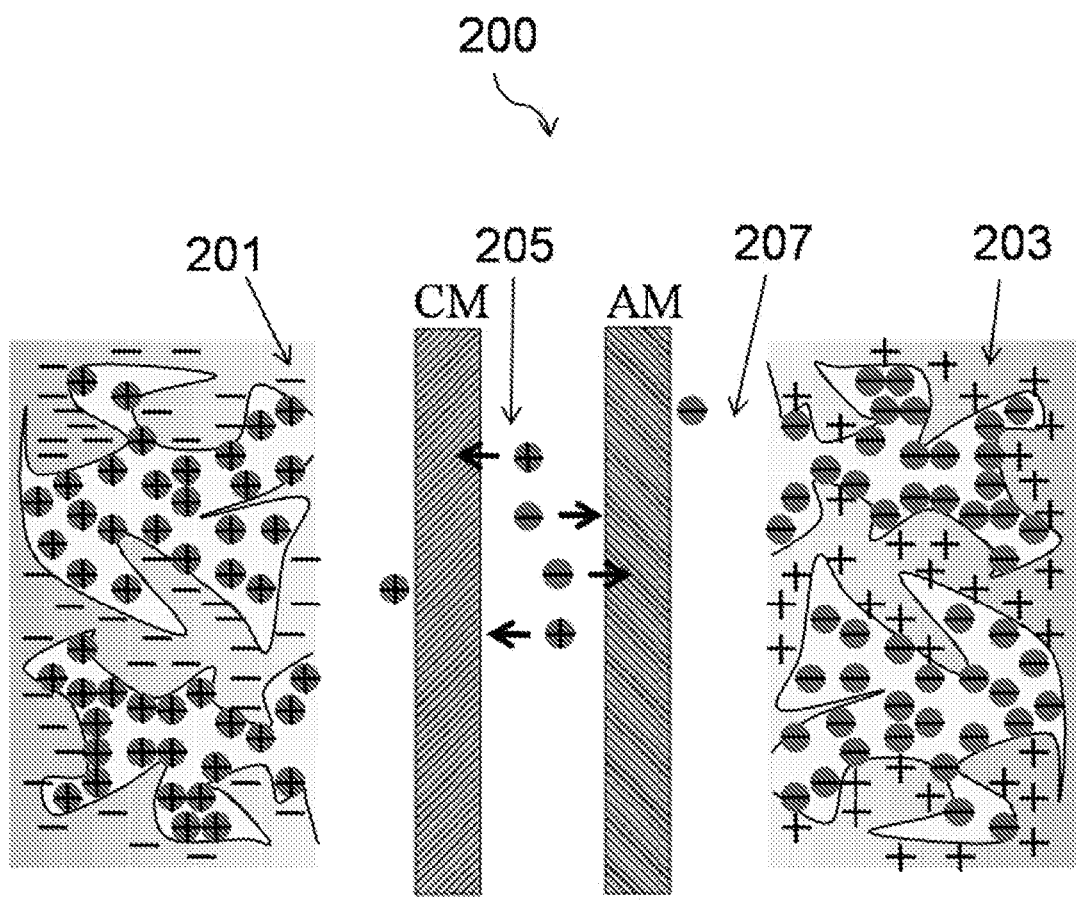
FIG. 2E schematically shows a working process of water purification of a membrane enhanced capacitive deionization device in accordance with this application.

CNTs-CNFs electrodes have been shown by the inventors of this application in *Appl. Phys. Lett.*, 89, 053127 (2006) to be more efficient electrosorptive electrodes and cost effective to manufacture due to lower temperature required in growing the CNTs-CNFs films. The article titled "Electrosorption of ions from aqueous solutions with carbon nanotubes and nanofibers composite film electrodes" by X. Z. Wang, M. G. Li, Y. W. Chen, R. M. Cheng, S. M. Huang, L. K. Pan, Z. Sun, in *Appl. Phys. Lett.*, 89, 053127 (2006) is thereby incorporated by reference. To further improve the efficiency, a membrane enhanced capacitive deionization (MEDC) device 200 is designed, as shown in FIG. 2E, where a cation-exchange membrane 205 and an anion-exchange membrane 207 are added to the space between the cathode 201 and the anode 203 with the cation-exchange membrane being adjacent to the cathode and the anion-exchange membrane being adjacent to the anode. The cation-exchange membrane is generally selectively permeable to cations and the anion-exchange membrane is generally selectively permeable to anions. The added ion-exchange membranes prevent the charge adsorbed ions on the electrode from dropping back into water by preventing migration of the appositely charged ions near the adsorbed ions. Also reduction of the migration of same charged ions to the electrode reduces the required electricity for charging the electrodes, thus more energy efficient.

Figure 2F:
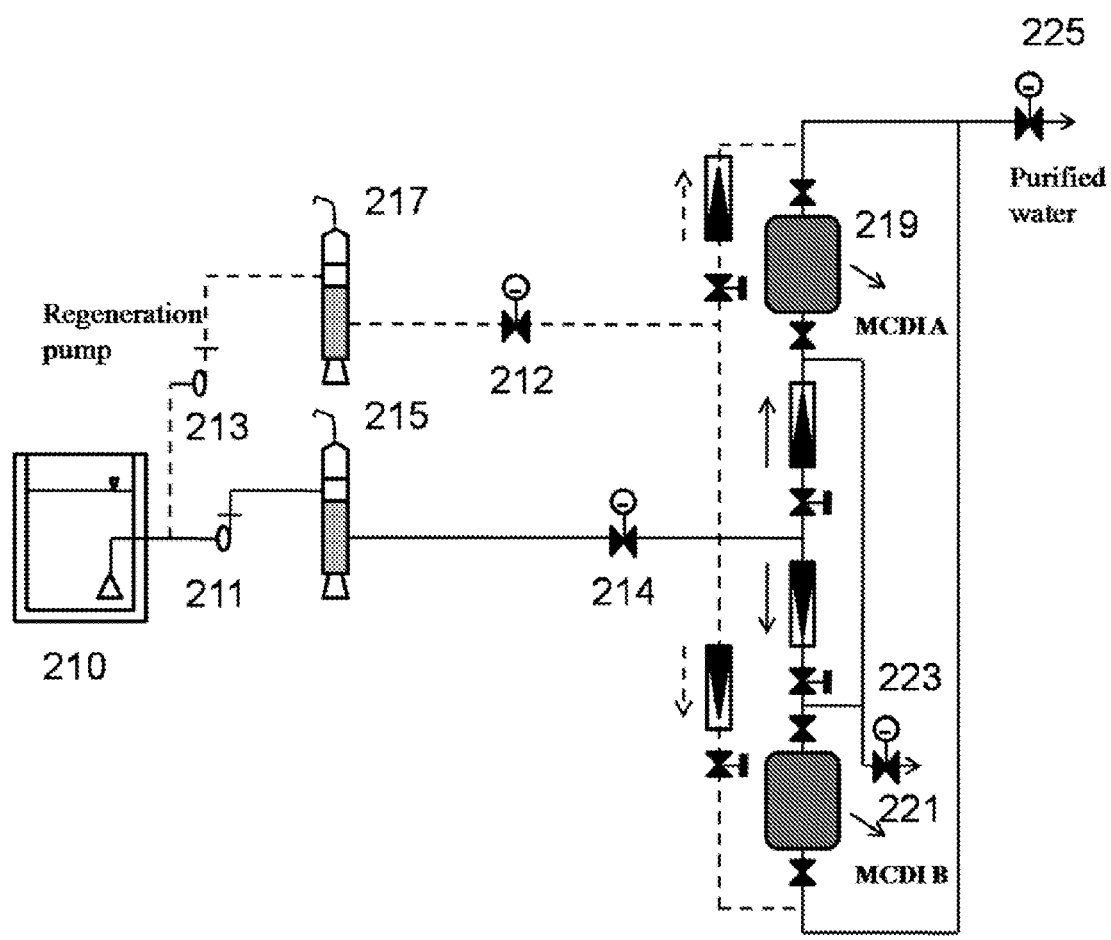
FIG. 2F schematically shows a full water purification system using a plurality of membrane enhanced capacitive deionization devices in accordance with this application.

In reference to FIG. 2F, a complete water purification system with MEDC devices and system is illustrated. Two water lines are involved. Water line 212 with water pump 213 and pre-filter system 217 is for system regeneration which works with reverse electric charge systems 216 to regenerate the system that washes out the adsorbed ions from the MEDC electrodes and ion-exchange membranes into the washout discard 223. Water line 214 with water pump 211, pre-filter system 215 is for water purification system which together with the electric charge system 218 and MEDC 219 and MEDC 221 deionization systems to output desalted and purified water 225.

Figure 3:
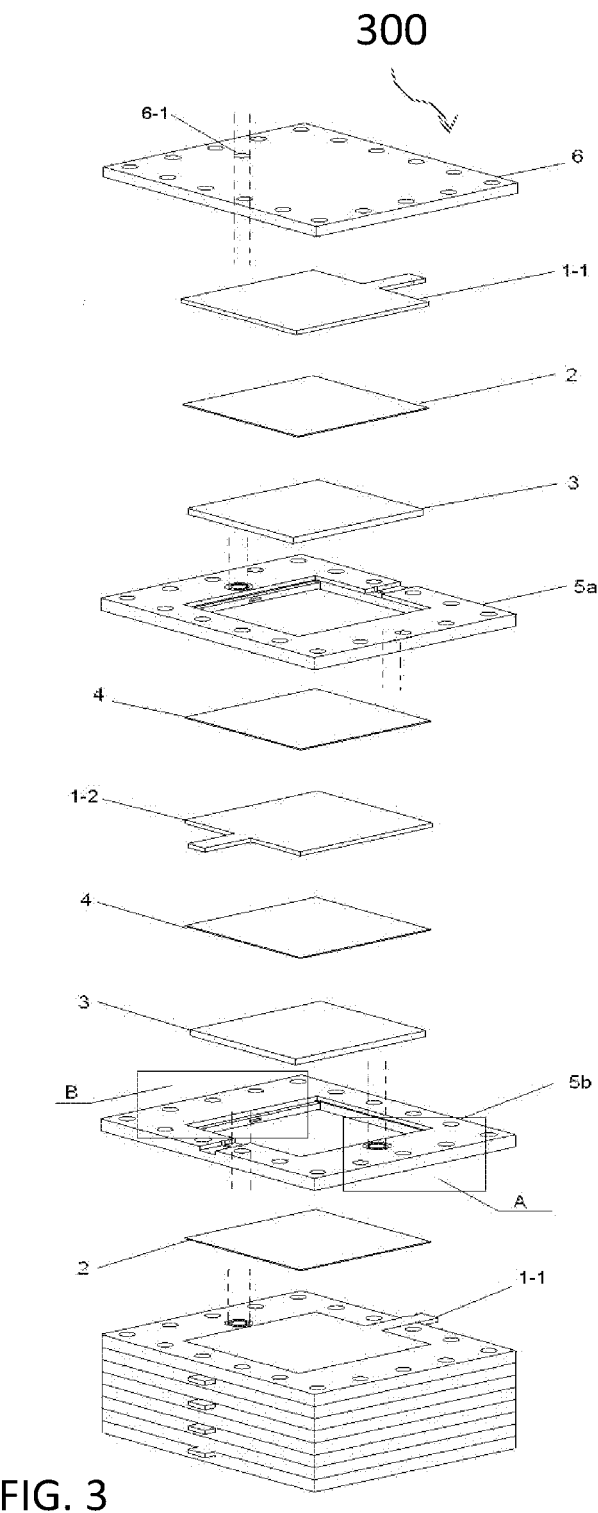
FIG. 3 is an expansive view of the structure of an example membrane enhanced capacitive deionization water purifying device in accordance to this application.

In reference to FIG. 3, an industrial scale workable stacking MEDC device assembly 300 includes a plurality of MEDC unit cells 301 with supporting spacer membranes 3 and insulating frames 5 (5a, 5b, 5c, etc for each unit cell). Electrode films 1-1 and 1-2 are capable of being charged with opposite charges. For example, if 1-1 is to be as cathode, 1-2 is to be as anode. Between electrode films 1-1 and 1-2 are insulator frame 5 and spacer membrane 3. Insulator 5 is designed to insulate the electrode films 1-1 and 1-2 from each other and also provide a water tunnel for water flowing into and out of the electric potential field formed by the electrode films. Spacer membrane 3 is water permeable porous-like sheet material to provide sufficient mechanical and structure support for stacking the electrode films and ion-exchange membranes. Essentially insulator 5 forms an insulating frame that holds spacer 3 in the middle, allowing water to flow into porous spacer 3 to be deionized by the electrodes. On both sides of spacer 3, are two sheets of ion-exchange membranes. On the side of the cathode is a cation-exchange membrane, on the side of anode is a anion-exchange membrane. For example if sheet 1-1 is configured to be a cathode, sheet 2 is a sheet of cation-exchange membrane that is selectively mainly permeable to cations; if sheet 1-2 is configured to be an anode, sheet 4 is a sheet of anion-exchange membrane that is selectively mainly permeable to anions.

Electrode sheets 1-1, 1-2 and ion-exchange membranes 2, 4, and spacer sheet 3 are similarly sized and shaped, with a width and length within 250 cm×250 cm, and a thickness of 0.01 to 2 mm. The ion-exchange membrane can be homogeneous membrane or heterogeneous membrane which contains a couple of activated ionic functional group and is selectively permeable to cation or anions. The resin component of a cation-exchange membrane would have negatively charged groups (e.g., $-SO_3^-$) chemically attached to the polymer chains (e.g., styrene/divinylbenzene copolymers). Attachment of positive fixed charges (e.g., $-NR_3^+$ or $C_5H_5N^+R$ where commonly $R=CH_3$) to the polymer chains forms anion permeable membranes, which are selective to transport of negative ions, because the fixed $-NR_3^+$ groups repel positive ions. There are many commercially brand names of ion-exchange membranes available in the water treatment industry. The spacer 3 with thickness of 0.01~1 mm is made up of insulated materials that are fabricated by organic or inorganic woven fabric or nonwoven fabric which can allow the water to flow through, such as porous polypropylene fiber or nylon fiber or propylene fiber as described in the Examples.

The electrode sheets 1-1, 1-2 comprising current collector and porous active materials, are designed to be in rectangular shape with strip bulge 1. This strip bulge 1 is used to connect with external power source. The current collector is about 0.2~2 mm thick, is generally made of high conductive, chemically and electrochemically anti-corrosive sheet material, for example, graphite paper, carbon fiber cloth, stainless steels, platinum or titanium sheet. The both sides of current collector are coated by porous carbon materials with pore sizes from 1 to 100 nm and thickness from 1 to 100 μm, such as activated carbon or carbon fiber or carbon aerogel or carbon nanotube or carbon nanotube-carbon nanofiber composites, or with graphene films. The preferred coating is a layer of carbon nanotube or carbon nanotube-carbon nanofiber composites which has a wide ion adsorption range, efficient even for big sized heavy metal ions.

Figure 4A:
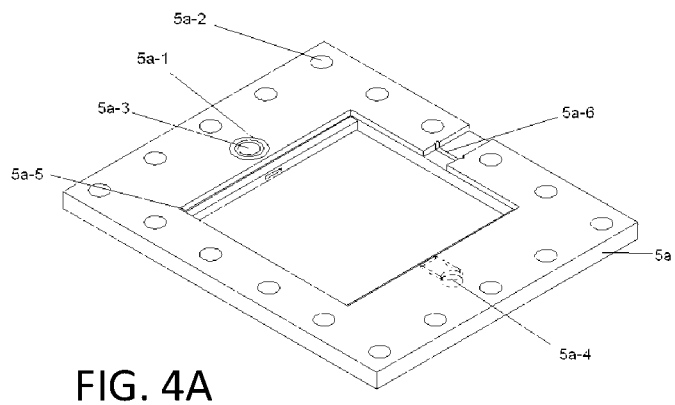
FIGS. 4A, 4B and 4C are perspective views of the structure of the insulating frame of an example unit cell of a membrane enhanced capacitive deionization water purifying device in accordance to this application.
Figure 4B:
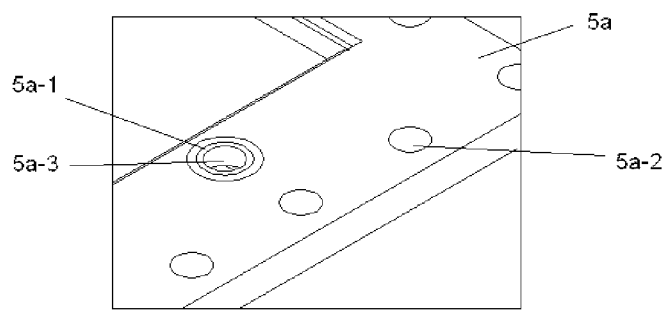
Figure 4C:
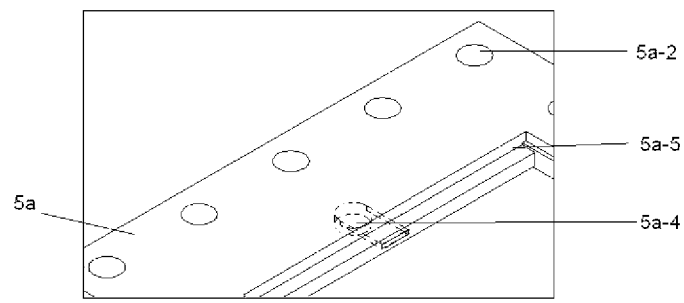

In reference to FIGS. 4A, 4B and 4C, an example structure of insulator frame 5a for stacking assembly is shown. Insulating holders 5 (including 5a, 5b, 5c etc.) are preferably configured to be a rectangular frame with a thickness of 2~10 mm and with an inner opening space to mount the electrode assembly unit cell 301, and are generally made of plastic plate with high mechanical strength, such as acrylonitrile butadiene styrene, polyvinylchloride, polymethyl methacrylate, polycarbonate or acryl glass. Step 5a-5 is configured at the inner frame to accommodate unit cell assembly 301 shown in FIG. 3. Groove 5a-6 is configured to match and hold the strip bulge 1 of the electrode 1-1. Groove 5a-6 is sealed with insulating and sealing material such as insulating mineral grease. Two holes 5a-3 and 5a-4 are disposed on the two opposite sides of insulator frame 5a, with 5a-3 on the top panel being water inlet hole and 5a-4 being on the bottom panel as water outlet hole.

Figure 5A:
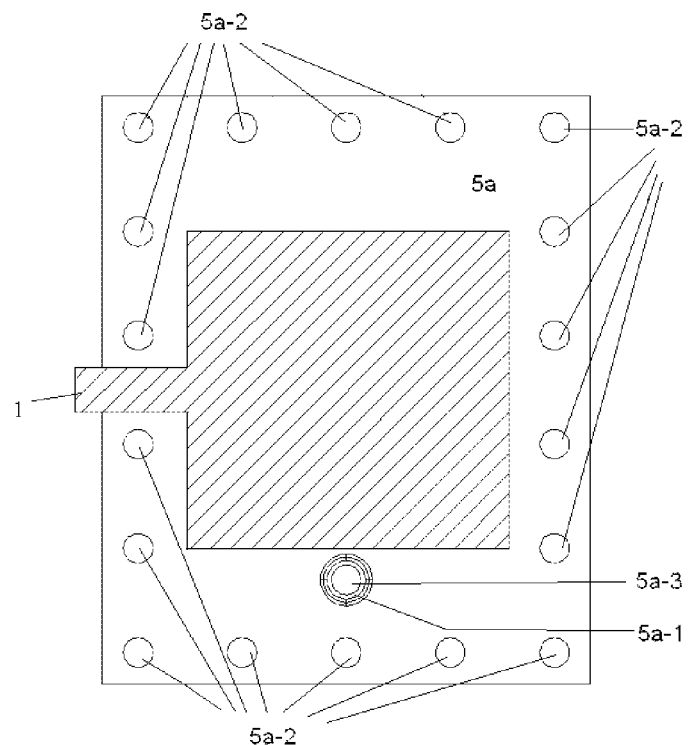
FIGS. 5A and 5B are cross sectional views from the top panel and the bottom panel of the structure of the insulating frame of an example unit cell of a membrane enhanced capacitive deionization water purifying device in accordance to this application.
Figure 5B:
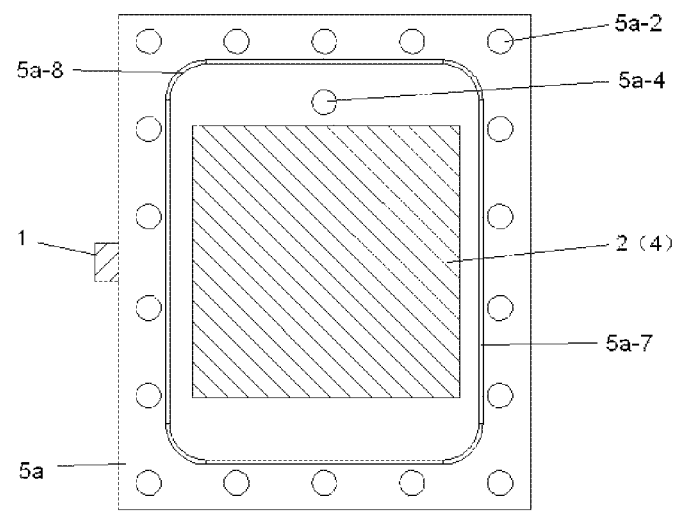
Figure 6A:
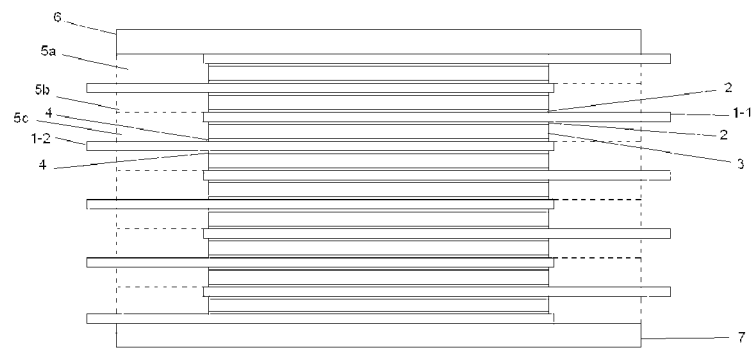
FIG. 6A is a cross-section view of an example membrane enhanced capacitive deionization water purifying device in accordance to this application.
Figure 6B:
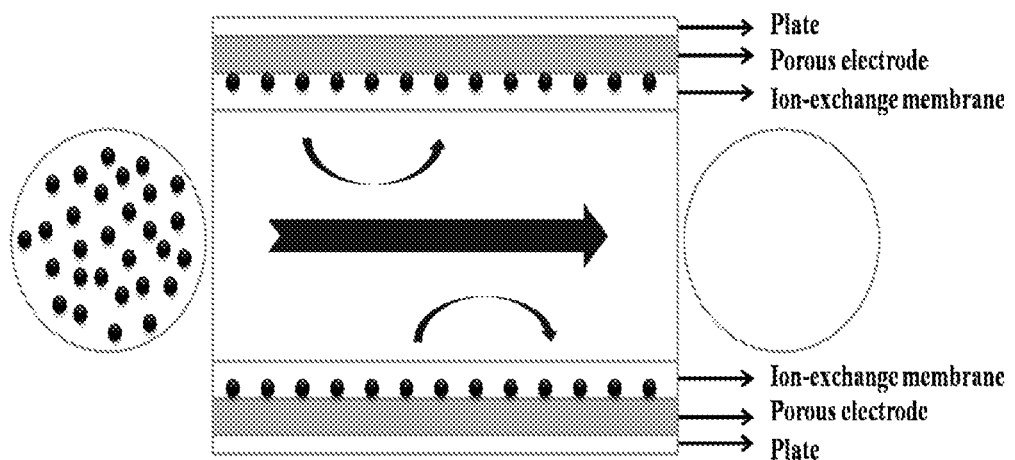
FIG. 6B schematically shows a working process of an example unit cell of a membrane enhanced capacitive deionization water purifying device in accordance to this application.

In reference to FIGS. 5A and 5B, a complete MEDC comprises multiple unit cells 301 stacking over each other organized via insulator frames 5 and is covered with a top insulating plate 6 and a bottom insulating plate 7 (shown in FIG. 6A). Top insulating plate 6, all insulating holders 5 and bottom insulating plate 7 are similarly configured with mounting holes such as 5a-2, and the assembled device are fastened together with screws tightened in mounting holes 5a-2. Water inlet holes as well as outlet holes are sealed with O-rings for preventing water leakage between stack connections. Between top plate and an insulator, insulators and insulators and insulator and bottom plate, grooves similar to 5a-7 are configures to hold an O-ring rubber such as 5a-8 to tightly seal the whole assembly stacking. A cross section view of multiple unit cell stacking for an industrial working water purification device is shown in FIG. 6A. FIG. 6B demonstrates the water purification process where when water passes through the device charged with electrical potential, ions will be attracted to the cat-ion and anion electrodes through the selective ion-exchange membranes, and the ion-exchange membranes keep these ions be adsorbed without falling off the electrode.

Figure 7A:
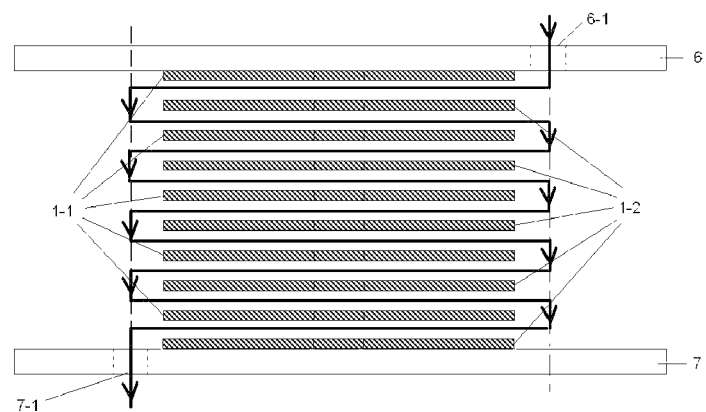
FIG. 7A schematically shows an example working process of an example membrane enhanced capacitive deionization water purifying device wherein unit cells are connected in series in accordance to this application.
Figure 7B:
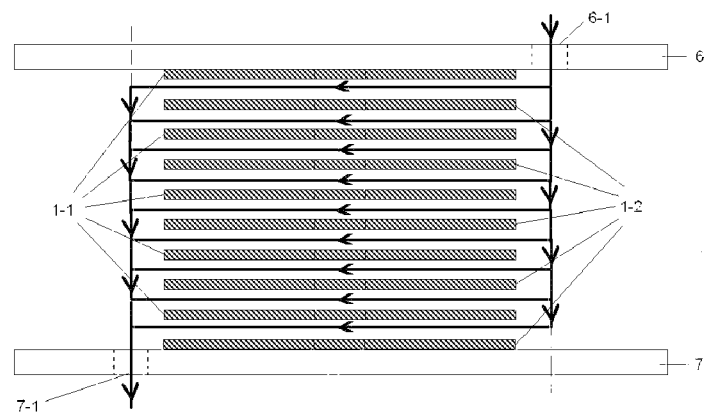
FIG. 7B schematically shows an example working process of an example membrane enhanced capacitive deionization water purifying device wherein unit cells are connected in parallel in accordance to this application.

In reference to FIGS. 7A and 7B, MEDC unit cells may be stacked and connected in series (FIG. 7A) or in parallel (FIG. 7B). In case of serial connection, the raw fluid enters into the entry hole 6-1 and crosses the top inlet hole 5a-3, goes through the first working compartment 5a and comes out from bottom outlet hole 5a-4, then enters into next working compartment 5b through inlet hole 5b-3 in the insulating holder of 5b and comes out from bottom outlet hole 5b-4. Similarly 5b-4 is connected with inlet hole 5c-3 of working compartment 5c and comes out through outlet hole 5c-4. In the end the fluid flow across the zigzag path of each compartment and exit as ion sufficiently free and purified water through exit hole 7-1.

In case of parallel connection, as shown in FIG. 7B, some of the row water goes through compartment 5a, some 5b, some 5c, etc, the de-ionized water are collected together through the exit hole 7-1.

Preferably, the carbon electrode films, the actual carbon composite film is graphene mixture generated carbon nanotubes (fibers, or other nanostructure carbons). The graphene has increased conductivity between nanotubes or fibers, whilst nanotubes or fibers serve as a high surface material for ion absorption, together with ion exchange membrane, the energy efficiency becomes very high and power consumption is lowered, and the whole device ion absorption capacity is very high. The fabrication of the electrode film process is under low temperature therefore large scale coating, such as screen printing, electroplating, dip coating, etc. may be used. Therefore with this innovation, the manufacturing cost is lowered while the performance of the MEDC is enhanced.

Figure 8A:
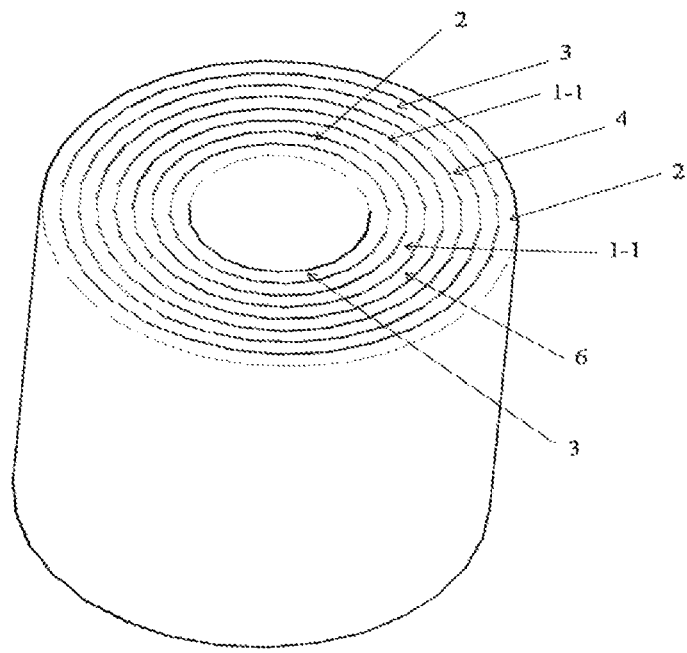
FIGS. 8A and 8B schematically shows perspective view a rolling electrode assembly unit of an example membrane enhanced capacitive deionization water purifying device in accordance with this application.
Figure 8B:
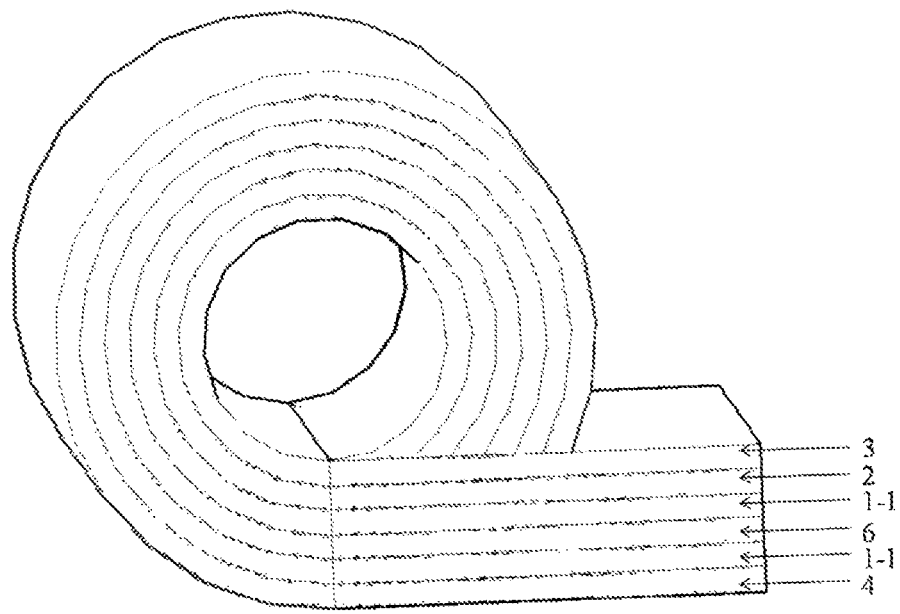
Figure 8C:
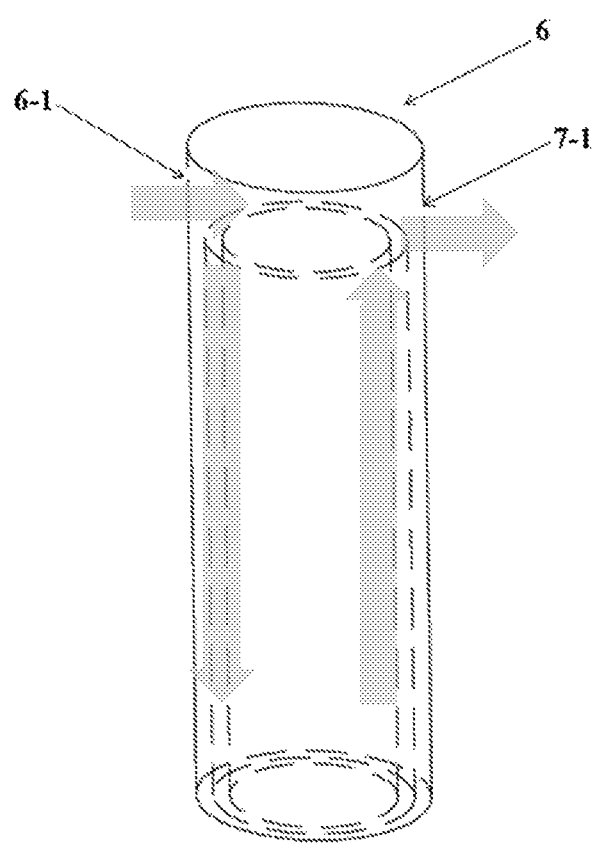
FIG. 8C schematically shows a working process of water purification of an example membrane enhanced capacitive deionization water purifying device having a rolling electrode assembly in accordance with this application.

In reference to FIGS. 8A and 8B, for large scale water de-ionization, the electrode films can be manufactured through screen printing on large graphite sheets, the de-ionization device may be made by stacking and rolling electrode films with ion-exchange films together insulating films. Insulating holder layer 6 is stacked in between the cathode film 1-1 and anode film 1-2 which are layered with their respective cation-exchange and anion exchange films 2 and 4. Insulating holder layer 6 is configured to have two water holes 6-1 and 7-1 for water entry and exit. As shown in FIG. 8C, the cylinder electrode pairs are contained into a cylindrical device where insulating holder layer 6's water entry hole 6-1 is used for flowing in untreated water, and the treated water is flowed out through hole 7-1 while film 1-1 and 1-2 are charged with negative and positive charges.

The MEDC water de-ionization device is regenerated by reversing the electric charges of film 1-1 and 1-2.

Example 1

CNTs-CNFs electrosorption electrode films were made by growing CNTs-CNFs structures on both sides of a 100 mm×100 mm×1.0 mm graphite paper. Specifically, the graphite papers with a resistivity of 0.0007 $\Omega$cm were degreased and cleaned by acetone and alcohol. A layer of thin Ni catalyst with particle size about 20 nm was deposited on the surface of the graphite substrates by direct current magnetic sputtering. CNTs-CNFs layers were subsequently grown on the graphite substrates using a low pressure and low temperature thermal chemical vapor deposition (CVD) system. Acetylene was used as carbon feedstock and hydrogen was used as the carrier/dilution gas. The flow rate of acetylene was around 40 sccm and the flow rate of hydrogen was around 200 sccm. At the temperature of 550° C., a layer of carbon nanotubes and carbon nanofibers was deposited onto the graphite papers. The CNTs-CNFs layer was grown on the graphite papers for about 30 min. The CNTs-CNFs graphite papers were then used as electrode films for the assembly of a MEDC device as shown in FIG. 3.

Homogeneous cation-exchange membrane (15 $\Omega/m^2$, 100 mm long×100 mm wide×0.3 mm thick) selectively permeable to cations and homogeneous anion-exchange membrane (20 $\Omega/m^2$, 100 mm long×100 mm wide×0.3 mm thick) selectively permeable to anions were used in assembling the CNTs-CNFs electrode films for a MEDC unit cell. Three MEDC unit cells were stacked together in serial connection mode. Insulating plates and holders were polyvinylchloride, spacers were nylon membranes.

The batch-mode experiments are conducted in a continuously recycling MEDC device. In each experiment, the solution was continuously pumped with a peristaltic pump into the device and the effluent was returned to the device. The solution temperature was kept at 298 K and a flow rate was around 40 ml/min. Analytical grade NaCl, $MgCl_2$ or $FeCl_3$ were used for the aqueous solutions and a direct voltage of 1.2 V was applied to the electrodes of the MEDC device. The relationship between conductivity and concentration was obtained according to a calibration table made prior to the experiment. The concentration variation of solution was continuously monitored and measured at the exit of the device using an ion conductivity meter.

Figure 9:
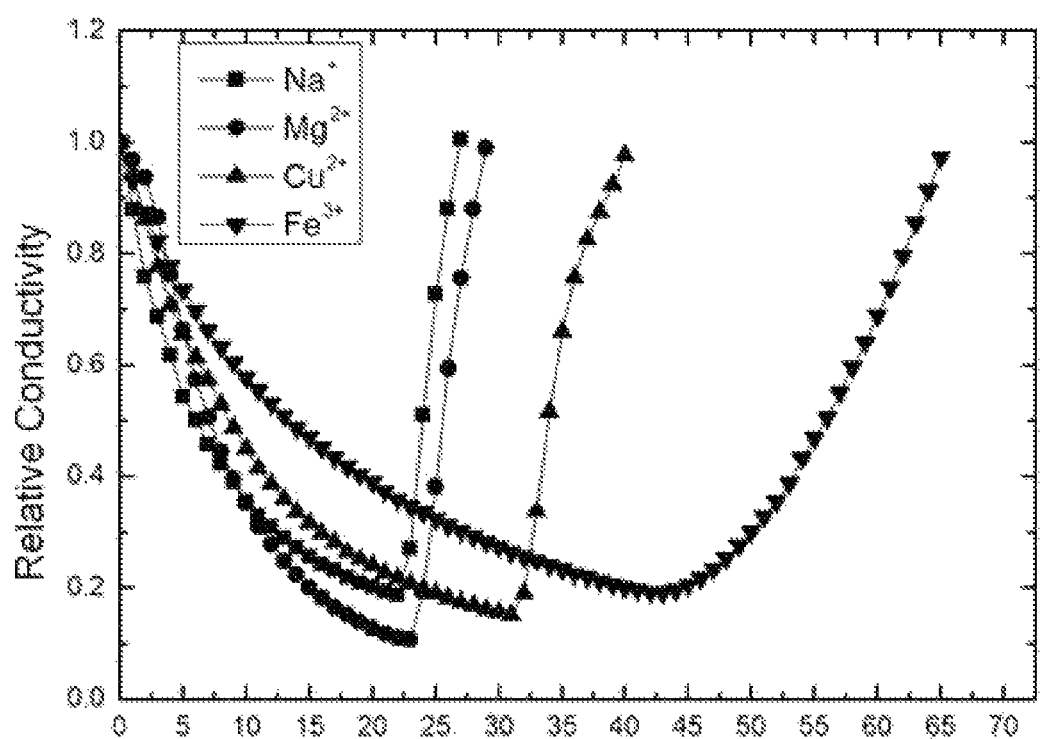
FIG. 9 shows test results of water purification and regeneration of an example membrane enhanced capacitive deionization water purifying device having unit cells connected in series in accordance with this application.

FIG. 9 shows the desalination result. Once the voltage was imposed, ions were driven onto the electrodes and the solution conductivity decreased dramatically within 45 seconds. Short-circuiting of the electrodes resulted in the recovery of solution conductivity to the initial value, indicating good regeneration of the electrodes. In addition, the ions with higher radius shows a better salt removal efficiency, a typical feature of a CDI, indicating the ion adsorption behavior does not change with the addition of ion-exchange membranes.

Example 2

Single-walled carbon nanotube as electrode material, graphite as conductive material and polytetrafluoroethene (PTFE) as binder were mixed and used to fabricate the electrode and their percentages in the final electrode were 70%, 20% and 10%, respectively. Ethanol (10-20 ml) was added dropwise into the mixture and then put into ultrasonic bath for 2 hours. Subsequently, the mixture was pressed on the graphite sheet, the resulted film was used as electrode films for the assembly of a MEDC unit cell. Each electrode was 100 mm long×100 mm wide×0.3 mm thick. Three MEDC unit cells were stacked together and connected parallel mode. Other assembly materials were the same as described in Example 1.

Figure 10:
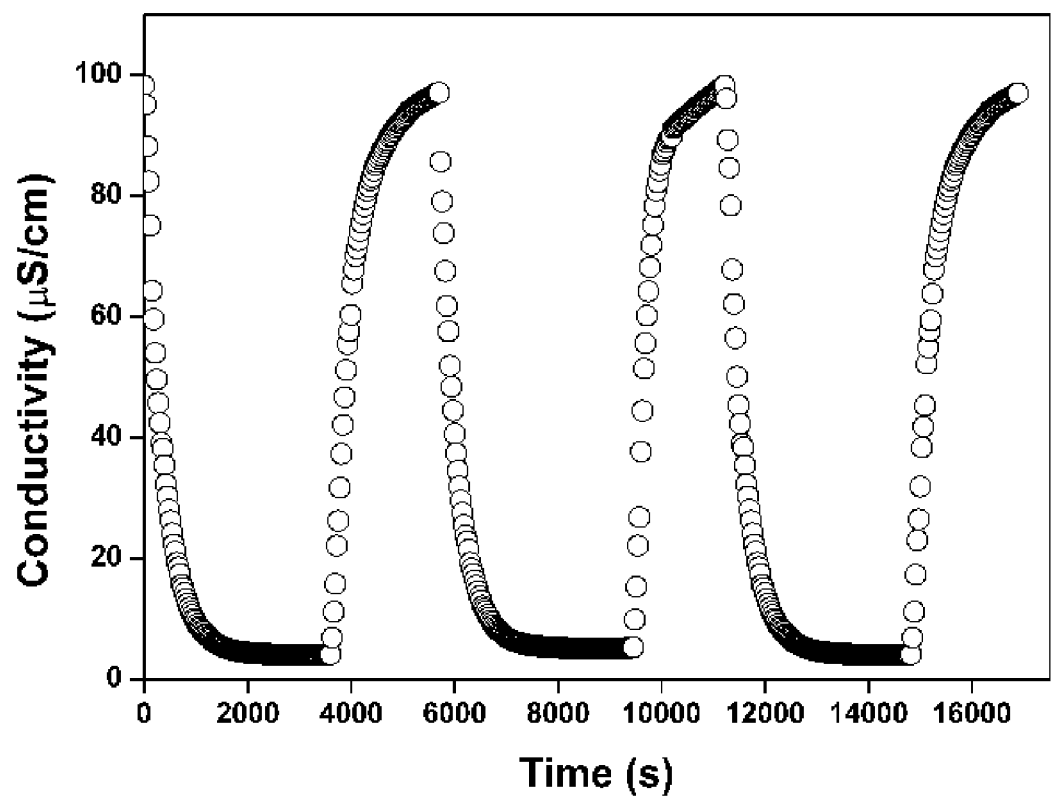
FIG. 10 shows test results of water purification and regeneration of an example membrane enhanced capacitive deionization water purifying device having unit cells connected in parallel in accordance with this application.

Batch-mode experiments were conducted as those described in Example 1. FIG. 10 shows the result of a three-cycle desalination-regeneration experiment of the MEDC device with a NaCl solution of an initial conductivity of 100 µS/cm. Within 1000 seconds, the solution was dramatically de-ionized, and the regeneration by short circuiting is almost complete. Further, after three cycles, the salt removal efficiency was remained at around 98%, indicating high efficiency in regeneration and long lifetime for a MEDC device.

Example 3

Graphite oxide (GO) powders were synthesized by a modified Hummers' method. Graphite powder was put into an 80° C. solution of concentrated nitric acid and sulfuric acid (1:1 in volume) and kept for 5 hours. The mixture was cooled to room temperature and diluted with deionized (DI) water and maintained for overnight. Then, the reaction vessel was immersed in an ice bath, and potassium permanganate was slowly added. The mixture was subsequently stirred for 2 hours. After the diluting with DI water, 30% $H_2O_2$ was added to the mixture, and the color of mixture changed into brilliant yellow along with bubbling. The mixture was then filtered and washed with HCl aqueous solution (1:10 in volume) to remove residual metal ions, and then washed with DI water until pH equals to 7. Exfoliation was then carried out by adding hydrazine for 24 hours at a temperature of 80° C. The resulted graphene was then used for fabrication of CNTs-CNFs electrode films.

The above synthesized graphene as electrode material, graphite as conductive material and polytetrafluoroethene (PTFE) as binder were mixed in 70%, 20% and 10% ratio. Ethanol (10-20 ml) was added dropwise into the mixture and was then put into an ultrasonic bath for 2 hours. The mixture was subsequently pressed on a graphite sheet to generate CNTs-CNFs electrode films. The films were assembled into a MEDC device. Each electrode was 100 mm long×100 mm wide×0.3 mm thick. Three MEDC unit cells were assembled and the assembly is connected in parallel connection mode. The other used materials and batch-mode experiments were the same as those described in Example 1. Similar results were obtained as shown in FIG. 10.

Example 4

A roller type MEDC device was generated. The carbon fiber fabric was first washed with DI water for several times until the conductivity was less than 1. The fabric was then placed on both sides of a flexible plastic layer conduit which served as an insulating holder. The ion-exchange membranes described in Example 1 were treated with saturated NaCl solutions and followed by soaking in DI water. Then the cation-exchange membrane and anion-exchange membrane was separately placed on either side of the carbon fiber fabric films sandwich assembly. The cation-exchange membrane coupled with carbon fiber fabric was then used as anion electrode, and the anion-exchange membrane coupled with carbon fiber fabric was then used as cation electrode. Finally, an insulating spacer was employed to put on either the side of the cation electrode or the side of the anion electrode to avoid shorting circuit during the electrosorption step. The as-prepared stack of carbon fiber fabric, flexible plastic and ion-exchange membrane was rolled along with an insulated spacer and was placed into a cylindrical container for testing. Similar result as to FIG. 10 was obtained.

Figure 11:
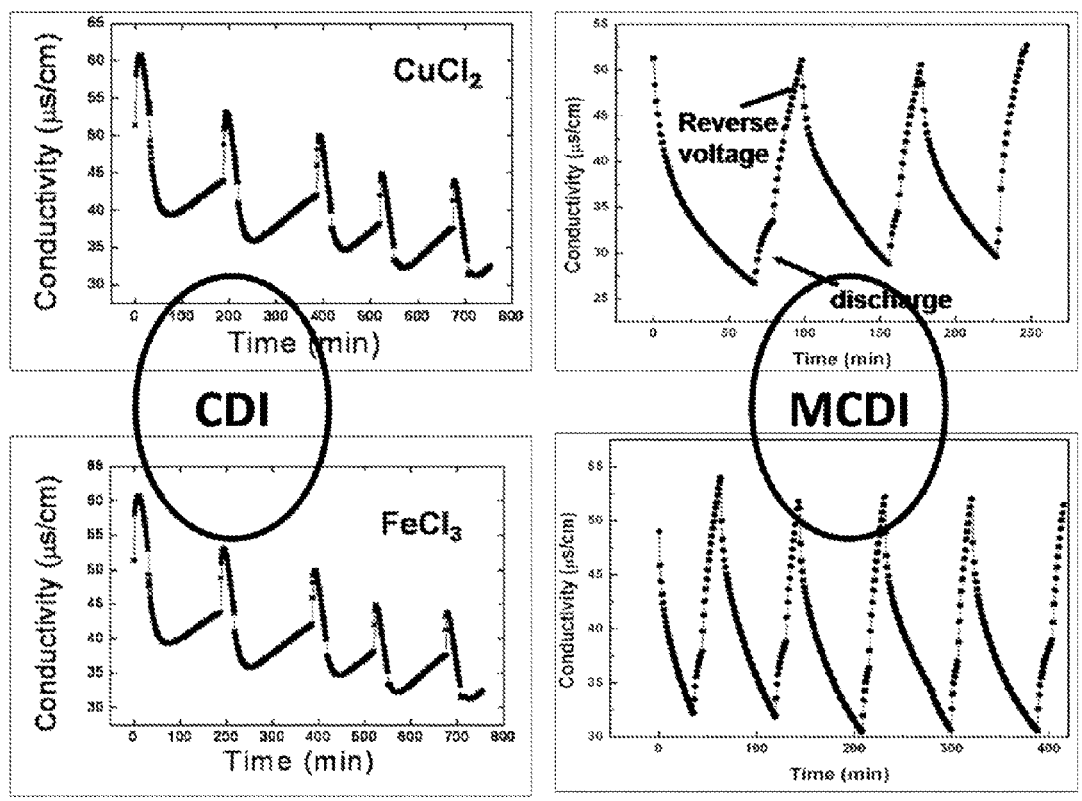
FIG. 11 shows comparative test results of water purification and regeneration between a CDI device and an example membrane enhanced capacitive deionization water purifying device having unit cells connected in parallel in accordance with this application.

FIG. 11 shows a comparison between a traditional CDI device and a membrane enhanced device. A MEDC device shows a dramatically improved efficiency in de-ionization as well as regeneration.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A membrane enhanced capacity deionization device assembly, comprising:
    a pair sheets of electric conducive electrode films coated with an additional layer of carbon nanotubes and carbon nanofibers;
    an independent and removable ion-exchange sheet having charged chemical groups that allow for oppositely charged ions to pass through, said ion-exchange sheet being paired with a similar-electonically charged said individual electrode film in said device assembly, and being positioned between said pair of electrode films; and
    an insulating holder frame made of material having resilient mechanical strength,
    wherein said electrode films and said insulating holder frame are paired in size and shape and are sized bigger than 10 cm×10 cm, and said insulating holder frame and said pair sheets of electrode films are mounted together to form a insulated water conduit so that water flows in between said pair sheets of electrode films and said pair of electrode films are connected to an electricity source to be charged to form an electrical field between said pair of electrode films.

2. The membrane enhanced capacity deionization device assembly of claim 1, wherein at least one of said coating of electrode films is made by screen printing, electroplating, or dip coating process.

3. The membrane enhanced capacity deionization device assembly of claim 1, wherein at least one of said coating of electrode films is made by coating graphite paper with a layer of graphene with a binder material.

4. The membrane enhanced capacity deionization device assembly of claim 1, wherein at least one of said coating of electrode films is made by coating graphite paper with a layer of carbon naotubes mixing graphene or carbon nanofibers mixing graphene with a binder material.

5. The membrane enhanced capacity deionization device assembly of claim 1, wherein said insulating holder frame is made of plastic material.

6. The membrane enhanced capacity deionization device assembly of claim 1 further comprising a layer of spacer membrane made of water penetrable material, disposed between said pair sheets of electrode films for providing mechanical support to said pair sheets of electrode films.

7. A membrane enhanced capacity deionization device assembly, comprising:
- a plurality sheets of electric conducive electrode films coated with an additional layer of carbon nanotubes and carbon nanofibers, sized bigger than 10 cm×10 cm;
- a plurality of independent and removable ion-exchange sheets having charged chemical groups that allow for oppositely charged ions to pass through, said individual ion-exchange sheet being paired with a similar-electronically charged said individual electrode film in said device assembly and respectively being positioned between a pair of oppositely charged electrode films; and
- a plurality insulating holder frames made of material having resilient mechanical strength, sized bigger than 10 cm×10 cm,
- wherein said each individual electrode film is stacked with another individual electrode film with one of said insulating holder frames mounted in between, forming a plurality of insulated water conduits between neighboring electrode films so that water flows in between each pair of said electrode films, said neighboring pair of electrode films are connected to an electricity source to be charged to form an electrical field between said pair of electrode films.

8. The membrane enhanced capacity deionization device assembly of claim 7, wherein at least one of said coating of electrode films is made by screen printing, electroplating, or dip coating process.

9. The membrane enhanced capacity deionization device assembly of claim 7, wherein at least one of said coating of electrode films is made by coating graphite paper with a layer of graphene with a binder material.

10. The membrane enhanced capacity deionization device assembly of claim 7, wherein at least one of said coating of electrode films is made by coating graphite paper with a layer of carbon naotubes mixing graphene or carbon nanofibers mixing graphene with a binder material.

11. The membrane enhanced capacity deionization device assembly of claim 7, wherein said insulating holder frames are made of plastic material.

12. The membrane enhanced capacity deionization device assembly of claim 7 further comprising a plurality of spacer membranes made of water penetrable material, with each one disposed between two neighboring sheets of electrode films for providing mechanical support to said electrode films.

13. The membrane enhanced capacity deionization device assembly of claim 12, wherein said plurality sheets of electrode films and said plurality of spacer membranes together with said plurality of insulating holder frames are rolled together, forming a plurality of cylindrical water conduits.

14. The membrane enhanced capacity deionization device assembly of claim 7, wherein said plurality of water conduits are connected in series.

15. The membrane enhanced capacity deionization device assembly of claim 7, wherein said plurality of water conduits are connected in parallel.

* * * * *